UNITED STATES PATENT OFFICE.

HENRY F. WILLIAMS, OF SAN FRANCISCO, CALIFORNIA.

PROCESS OF DESULPHURIZING ORES.

SPECIFICATION forming part of Letters Patent No. 229,509, dated June 29, 1880.

Application filed January 3, 1880.

*To all whom it may concern:*

Be it known that I, HENRY F. WILLIAMS, of the city and county of San Francisco, in the State of California, have invented a new and useful process for eliminating sulphur and arsenic, antimony, and other base or noxious metals from the ores of precious metals, which process I now set forth in detail.

My invention consists, first, in reducing the ores of precious metals to minute particles; second, in intimately mingling such particles with hydrocarbons; and, third, in subjecting such particles thus mingled, while exposed to proper air-draft, to heat and flame produced entirely by the combustion of the hydrocarbons and the inflammable gases generated in such combustion.

In working my process the ore may be reduced to minute particles in a stamp-mill, or in any other convenient or usual way. The mingling of the hydrocarbons with the ore in a finely-divided state may be done by reducing the hydrocarbons to a finely-divided state in any convenient way, or by employing them in a liquid form, and the act of mixing may be done by stirring both the fine ore and the hydrocarbons together, or mixing them in a suitable vessel adapted to be rotated; or they may be intimately mingled in any other well-known and convenient way.

The finely-divided ore, intimately mingled with the hydrocarbons, may be subjected to heat and flame in any suitable contrivance which will hold the material in position and allow a sufficient supply of air to feed combustion of the hydrocarbons and the gases generated by such combustion, it being understood that in every instance the heat and flame used in my process is that which springs from the material itself and the air which feeds the combustion.

I have found that a very convenient mode of using my process is to put the fine ore, intimately mingled with fluid asphaltum, upon some wood shavings or paper, in a furnace having a flame-chamber, with a bottom having numerous small openings for air-currents, and under this a chamber adapted to hold air under pressure to be forced into the chamber above. Fire being communicated to the shavings or paper, and fine currents of air under pressure being admitted to the flame-chamber, the hydrocarbons, mingled with the fine ore, speedily take fire, in turn setting fire to the sulphur, which is immediately released, and to the gases generated by the act of combustion. The whole mass burns up with a brisk flame, but with very little heat, and the operation of eliminating the noxious or undesirable metals, &c., is completed in a few minutes. The material left after such treatment is in a light porous condition, something like pumice-stone, and is readily crushed or ground, and fit for amalgamation.

I have found that when using fluid asphaltum, or asphaltum melted to a fluid state, one part, by weight, is sufficient for mingling with nine parts, by weight, of the fine ore; but in many instances a much smaller proportion of asphaltum is sufficient.

I have found, also, that my process is effective, not only with ores as they are taken from the veins, but with concentrates, and with the "flue-dust" so called, which collects in ordinary smelting-furnaces.

I have found my process equally effective with sulphurets of a high grade, as well as those of a low grade, and with ores containing arsenic, antimony, and tellurium, and the result has been that not only these noxious and undesirable metals were eliminated, but other metals which would affect the perfect and favorable action of quicksilver in amalgamation.

I find from my experiments that my process saves the precious metals very nearly to the assay-test; that it is very simple compared with other processes in general use, and is also cheap compared with these processes just named.

I am aware that ores have been finely divided before further treatment, that ores have been intimately mingled with hydrocarbons, and the mass thus formed has been smelted; and therefore I do not claim either of these steps of my process separately. I am not aware, however, that before my invention the ores of precious metals have been intimately mingled, in a fine condition, with hydrocarbons and the mass ignited, and purified from noxious metals by flame and heat produced entirely by the combustion of the hydrocarbons and the inflammable gases generated in such combustion, as I have described; and therefore

I claim as my invention and desire Letters Patent for—

The process of eliminating sulphur and arsenic, antimony, and other noxious metals from the ores of precious metals, which consists, first, in reducing such ores to minute particles; second, in intimately mingling such particles with hydrocarbons; and, third, in subjecting such particles, while under exposure to air-drafts, to heat and flame produced entirely by the combustion of the hydrocarbons and the inflammable gases generated in combustion, substantially as described.

In testimony that I claim the foregoing I have hereunto set my hand and seal this 24th day of December, 1879.

HENRY F. WILLIAMS. [L. S.]

Witnesses:
 C. W. M. SMITH,
 CHAS. D. WHEAT.